United States Patent Office

3,493,535
Patented Feb. 3, 1970

3,493,535
POLYETHYLENE MALEATE DIESTER GRAFT COPOLYMERS CONTAINING CERTAIN FILLER MATERIAL
Robert J. Zeitlin, Wayne Township, Passaic County, N.J., assignor to Allied Chemical Corporation, New York, N.Y., a corporation of New York
No Drawing. Continuation-in-part of application Ser. No. 484,766, Sept. 2, 1965. This application July 21, 1966, Ser. No. 566,772
The portion of the term of the patent subsequent to Aug. 16, 1983, has been disclaimed
Int. Cl. C08f 15/16
U.S. Cl. 260—41                         15 Claims

ABSTRACT OF THE DISCLOSURE

Polyethylene maleate diester graft copolymers are combined with fillers selected from the group consisting of titanium dioxide, carbon black, antimony trioxide, ammonium fluoborate and chlorinated hydrocarbons to provide compositions having especially good elongation and substantially undepreciated tensile strength. The filler may be used to extend the graft copolymer or to impart certain desirable properties, such as flame retardance, to the polymer, or may be used to do both.

---

This application is a continuation-in-part application of Ser. No. 484,766, filed Sept. 2, 1965, now abandoned, which in turn is a continuation-in-part of application Ser. No. 199,276, filed June 1, 1962, now abandoned.

The present invention relates to a novel and useful composition and to a process for producing the composition. More particularly, it relates to a high density polyethylene-maleic acid diester composition containing an inert particulate material and to a process for preparing such a composition.

It is known in the art that various anti-oxidants, stabilizers, fillers, modifiers, pigments and the like may be added to polyethylene compositions. It is also known that high density polyethylene may be made flame resistant by the addition of a chlorinated hydrocarbon of high chlorine content, such as chlorinated paraffin, and an inorganic flame retardant material such as antimony oxide. Such compositions are described in U.S. Patents 2,480,298; 2,590,211; 2,669,521; 2,962,464 and 3,006,787. While compositions containing such materials have received widespread acceptance in the art, polyethylene compositions containing such materials tend to show lower tensile properties and a lower percent elongation even at low to moderate "loading." The decrease in physical properties of such compositions somewhat limits the amount of additives that can be used if the physical properties of the composition are to be maintained at a high level. Quite obviously, if an inexpensive polyethylene composition were to be provided which would have quite high physical properties even at high "loading," the composition would be highly desirable in certain applications.

It is an object of the present invention to provide a high density polyethylene-maleic acid diester graft copolymer composition which will retain quite high physical properties even with moderate to high "loading" of solid inert particulate material. A further object is to extend a polymer composition by the use of a high percentage of inert fillers. Another object is to provide a conductive sheet. A still further object is to provide a non-drip, flame retardant polymeric composition. Another object is to provide a polymeric composition having good tensile properties and a quite high percentage elongation even with moderate to high "loading" of solid inert particulate materials. Another object is to provide a modified polymeric composition which shows only a small amount of shrinkage in molding. A still further object is to provide a process for producing compositions which are particularly useful in the various molding processes. Other objects will become apparent as the description of the invention proceeds.

These objects are accomplished by the present invention which provides a polymer composition comprising a blend of (1) a graft copolymer of (A) a polyethylene polymer having a density of at least about 0.940 and containing at least about 90% by weight of ethylene in the polymer chain and (B) a maleic acid diester, the maleic acid diester being present in the graft copolymer in amounts of from about 0.5 to about 12% by weight and (2) a solid inert particulate material, the said particulate material being present in amounts of from about 0.5 to about 125 parts per 100 parts of the graft copolymer on a weight basis, said inert particulate material desirably selected from the group consisting of titanium dioxide, carbon black, antimony trioxide and mixtures thereof.

The present invention also provides a process for producing a polymer blend which comprises mixing (1) a solid inert particulate material with (2) a graft copolymer of (A) a polyethylene polymer having a density of at least about 0.940 and containing at least about 90% by weight of ethylene in the polymer chain and (B) a maleic acid diester, the maleic acid diester being present in the graft copolymer in amounts of from about 0.5 to about 12% by weight.

In a preferred embodiment of the present invention, the composition is formed by heating the graft copolymer to a temperature above the softening point and then blending in from about 0.5 to about 125 parts of the solid inert particulate material per 100 parts of the graft copolymer on a weight percentage basis. In a still more preferred embodiment of the present invention, the graft copolymer contains from about 3 to about 10% by weight of the maleic acid diester and the polymer blend contains from about 5 to about 100 parts of the solid inert particulate material per 100 parts of the graft copolymer.

The term "blend" is used to include a chemical admixture of graft copolymer particles and the solid inert particulate material as well as the mixture obtained by heating the graft copolymer to a temperature above the softening point and then incorporating the solid inert particulate material. When the "blend" is formed by the use of heat, it is preferably recovered in pellet form so that it is suitable for future molding processes.

The expression "a polyethylene polymer having a density of at least about 0.940 and containing at least about 90% by weight of ethylene in the polymer chain" signifies the conventional polyethylenes as described, for example, in U.S. Patents 2,949,447 and 2,825,721. The polymer, therefore, may be the polyethylene homopolymer or a copolymer obtained by reacting ethylene with a comonomer such as propylene; butene-1; butene-2; 3-methyl butene-1; pentene-1; hexene-1; 1,3-butadiene and the like, as well as mixtures of such comonomers. Other equally suitable comonomers are described in the aforementioned patents.

The terminology "solid inert particulate material" signifies any finely divided material which is rigid and does not react with the molten graft copolymer when the polymer is melted. Such materials include the well-known inorganic or organic modifying materials such as pigments, delustrants, fillers, extenders, conductors, antioxidants, stabilizers, modifiers, and the like. Specific materials which are suitable are antimony oxide, titanium dioxide, ammonium fluoborate $NH_4BF_4$, zinc tetramine fluoborate and nickel hexamine fluoborate, carbon black, graphite, calcium carbonate, wood floor, asbestos, iron oxide, brown factice, gilsonite, clay, silica, mica glass flake, fibrous glass, powdered silver, zeolites, cadmium sulfide, chrome yellow, zinc oxide, iron blue pigments and the like. In general, the particulate material should be fine enough to pass a 10 mesh and preferably a 20 mesh, screen although where special surface effects are desired the material may be of 4 mesh size or even larger.

The term "recovering" is employed in its broadest sense to include any system which utilizes the blend formed in the process. Thus, the term includes recovery of the blend in the form of pellets, powders and the like, as well as shaped articles formed directly from the molten polymer such as sheets, films, tubing, molded articles and the like.

The "blend" may be formed by mixing particles of the individual components with or without heating. Preferably, the mixing is carried out at a temperature above the softening point of the composition so that an intimate mixture of the constituents is formed. In general, the heating should be to a temperature above about 115° C. and it is preferred to use temperatures ranging from about 150° C. to about 300° C. Temperatures substantially above about 325° C. are generally to be avoided in order to avoid substantial decomposition of the polymeric ingredients. However, if the decomposition products are not undesirable in the composition, higher temperatures may be employed.

A convenient method of preparing the desired blend is to premix the ingredients in finely divided form and then mix the composition in a heated roll mill or Banbury mixer. When a physical admixture is desired, any of the conventional pieces of equipment for forming physical mixtures may be employed.

The advantages of the present invention are illustrated by an especially preferred embodiment of the invention in which compositions having flame-retardance and a very desirable combination of other properties are produced for use in special electrical insulating application such as in multi-wire insulating tape employed in computer systems. Compositions produced in accordance with such embodiment comprise the ethylene-maleic acid diester graft copolymer; 15 to 60 parts, preferably 20 to 50 parts, per 100 parts of the graft copolymer of a halogen-containing material containing having a halogen content between 35 to 80% by weight, preferably a chlorine containing material of chlorine content between 50 to 70% by weight; and 8 to 40 parts, preferably 12 to 25 parts, per 100 parts of the graft copolymer of antimony trioxide, the ratio by weight of the halogen-containing material to antimony trioxide being preferably within the range of 1:1 to 3:1, desirably 1.5:1 to 2.5:1. An unusual and highly desirable combination of properties has been found unexpectedly obtainable for products produced from the above especially preferred compositions, for example, the combination of non-drip flame retardance according to Chicago Underwriters Laboratories (Research Bulletin No. 55); high tensile strength of at least 1200 p.s.i., more usually between 1500–2500 p.s.i.; Elongation at yield of at least 5%, more usually 6–15%; Elongation at break of at least 250%, more usually 275–600%; Dielectric Constant not in excess of 2.75, more usually not in excess of 2.65; Dissipation Factor at 1 megacycle of not in excess of 0.007, more usually between 0.004 and 0.006; absence of Environmental Stress Cracking in accordance with ASTM Test 1693 with a sample annealed 20 hours at 85° C. and then found not to crack after 600 hours immersion; and finally excellent heat aging determined after 240 hours at 85° C. such at least 75% of the original tensile strength, at least 50% of the original Elongation at break, at least 90% of the original Elongation at yield, and approximately 100% of the original Dielectric Constant and Dissipation Factor, are retained in the heat age composition. In producing the especially preferably antimony trioxide compositions the halogen-containing material may be any suitable hydrocarbon material having a halogen content between 35% to 80%, preferably 50% to 70%, and miscible with the ethylene-maleic acid graft copolymer to produce compositions in which the halogen-containing material is non-bleeding, i.e. will not migrate from the composition sufficient to coat the surface thereof and substantially reduce the properties of the composition over extended time periods. Examples of halogen-containing materials which may be employed include polytetrafluoroethylene, polychlorotrifluoroethylene, tetrachlorophthalic anhydride, tetrabromophthalic anhydride, and the Diels-Alder adducts of perchlorocyclopentadiene such as chlorendic anhydride and derivatives of chlorendic anhydride such as esters, amides and imides formed therefrom. The preferred halogen-containing materials are those normally solid at room temperature, more usually at a temperature of at least 70° C. and characterized by a substantial absence of hydrolyzable chlorine. Chlorendic anhydride, its derivatives and related compounds are among the more preferred materials. An example of such a preferred chlorine-containing material is a cycloocta (a,e) bis-bicyclo (2:2:1) hexachlorohept-5-ene which may be prepared as a Diels-Alder adduct of 2 moles of perchlorocyclopentadiene and 1 mole of cyclooctadiene. A preferred solid material of similar utility and performance containing approximately 65.1% chlorine and having a melting point greater than 350° C. is obtainable commercially under the trademark "Dechlorane+Plus." It has been also found that particle size of the solid halogen-containing materials is important in producing products having the outstanding combination required for certain applications such as electrical insulation or coatings. Accordingly, particle size of the halogen-containing component is desirably such that at least about 80% passes a 200 mesh U.S. standard screen, more preferably such that at least 80% passes a 325 mesh screen. Particle size of the antimony trioxide component is preferably also such that about 80% or more is less than 200 mesh, more usually less than 325 mesh. In producing the especially preferred flame-retardant compositions thorough admixture of the components has been also found important to the development of desired maximum properties and best assured by subjecting the components to intensive shear mixing such as in a Banbury mixer for at least 8 minutes, preferably 12 to 20 total minutes in two or more mixing cycles.

The graft copolymers employed in the present invention are prepared by heating a composition comprising (A) from about 70 to about 99% by weight of a polyethylene polymer having a density of at least about 0.940 and containing at least about 90% by weight of ethylene in the polymer chain and (B) from about 0.5 to about 30% by weight of a maleic acid diester, to a temperature above the melting point of the said polyethylene polymer, mixing the molten composition in the presence of at least about 0.02% by weight, based on the weight of said composition, of a hydroperoxide having a half life of at least one minute at 145° C. and thereafter recovering the resulting graft copolymer.

The "maleic acid diesters" suitable for use in forming the graft copolymer are any having the formula:

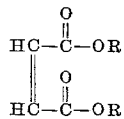

wherein each R is an organic radical. Among the various maleate diesters suitable for use in the present invention are: dimethyl maleate; dipropyl maleate; diisobutyl maleate; dibutyl maleate; dipentyl maleate; dicyclopentyl maleate; dihexyl maleate; dicyclohexyl maleate; dioctyl maleate; didodecyl maleate; dibenzyl maleate; di(2-phenylethyl) maleate; di(2-ethylhexyl)maleate; di-(tetrahydrofurfuryl) maleate; p-chlorophenyl methyl maleate; methyl ethyl maleate; ethyl butyl maleate; propyl cyclohexyl maleate; phenyl ethyl maleate and the like. In a preferred embodiment of the present invention, each alcohol residue of the maleate diester is a hydrocarbon radical which contains from about 4 to about 18 carbon radicals.

Any of the hydroperoxides known in the art which have a half life of at least one minute at 145° C. may be employed for forming the graft copolymer employed in the present invention. Such hydroperoxides having the general formula R—O—OH, wherein R is an organic radical. Among the suitable hydroperoxides are t-butyl hydroperoxide; p-menthane hydroperoxide; pinane hydroperoxide; and cumene hydroperoxide as well as others known in the art.

In carrying out the preparation of the polyethylene graft copolymer, the components of the composition are merely mixed and heated to a temperature above the melting point of the polyethylene polymer. The elevated temperature causes rapid decomposition of the hydroperoxide with formation of the graft copolymer. Obviously, the more homogeneous the mixture prior to heating, the less mixing will be required of the molten composition. However, in order to obtain a desirable conversion, it has been found that some form of mixing is highly desirable even when a uniform mixture of all the components of the composition is formed prior to heating. In general, the composition should be heated to a temperature above about 130° C. and it is preferred to use temperatures ranging from about 270 to about 320° C. Temperatures substantially above about 325° C. are generally to be avoided in order to avoid substantial decomposition of the polymeric ingredients. However, if the decomposition products are not undersirable in the product, higher temperatures may be employed. The reaction time required is quite short, being of the magnitude of from a few seconds to about twenty minutes, although extended heating times do not substantially affect the product and may be employed when desired.

The preparation of the graft copolymer is completely described in copending application, Ser. No. 195,987, filed May 18, 1962, now U.S. Patent 3,267,173.

In the specification and claims all parts are expressed in parts by weight unless otherwise stated.

The density is given in grams per cubic centimeter at 23° C. as measured in a density gradient column such as that described in "Journal of Polymer Science," vol. 21, p. 144, 1956.

The following examples are given to illustrate the invention and are not intended to limit it in any manner.

In the examples, the melt index is reported in decigrams per minute and is determined by the standard ASTM–D–1238–59T test unless otherwise reported. However, for polymers having a 0.0 melt index according to this method, a modified method, designated $MI_{21}$ is sometimes employed which utilizes a 21,600 gram weight rather than a 2,160 gram weight as in the aforementioned test. All other conditions of the standard test remain the same in the modified procedure. This test merely gives a better indication of the melt index of materials which give a 0.0 measurement by the standard test.

The percent elongation, the tensile strength at yield in p.s.i. and the ultimate tensile strength in p.s.i. are measured by the standard ASTM–D–638–60T test using a cross-head speed of 20″/min. The Volume Resistivity is measured according to the standard ASTM–D–257–58 test.

The "high density" polyethylene polymers employed in the examples are prepared according to the process set forth in U.S. Patent 2,949,447 or 2,825,721. When employing the process of U.S. Patent 2,949,447, a pressure of about 450 p.s.i. is employed with a temperature of 205–210° F., a reaction time of about 2 hours and chromium oxide supported on silica/alumina as the catalyst. When employing the procedure of U.S. Patent 2,825,721, a pressure of about 450 p.s.i. is employed with a reaction time of about 2 hours and chromium oxide supported on silica/alumina as the catalyst. The polymerization temperature utilized in this procedure is indicated in the examples.

The chlorinated paraffin wax employed in the examples is paraffin wax which has been chlorinated so as to contain about 70% of chemically combined chlorine. The chlorinated wax is sold commercially under the name "Chlorowax 70" and is more specifically described in U.S. Patent 3,006,787.

In the examples, the melting point of the polymer is determined by the conventional procedure employing a polarizing microscope. The amount of the maleate diester actually incorporated into the polymer is determined by a weight-percentage basis employing infrared analysis (Perkin-Elmer Model 21 Spectrometer).

The extruders employed in the examples are of the tubular type with a screw feed. While two different extruders are actually employed in the examples, the heating chamber of each contains a plurality of zones which are maintained at different temperatures by means of an electric heating element surrounding each zone. The temperature profile is given from Zone 1 (the feed end of the machine) to the zone immediately adjacent to the extrusion die.

EXAMPLE 1

Preparation of polyethylene/butene-1/diethyl maleate graft copolymer

A high density polyethylene copolymer containing about 1.59% of butene-1 is prepared in accordance with U.S. Patent 2,949,447, as previously described, to give a copolymer having a density of 0.943, a melt index of 0.0 and an $MI_{21}$ of 1.6.

41.1 pounds of the polyethylene copolymer are mixed in a ribbon blender with a solution of 7.95 pounds of diethyl maleate and 0.85 pounds of t-butyl hydroperoxide. The homogeneous mixture is fed into a "Sterling" one inch extruder having a length to diameter ratio of 24 to 1 and equipped with electric temperature controls covering 3 heating zones. The feed end is cooled with tap water and the screw speed is 40 r.p.m. The temperature profile is Zone 1=305° F., Zone 2=600° F., Zone 3=397° F. and die temperature=375° F. The pressure in the extruder is about 2,700 p.s.i. The extruded product is cut into pellets having a size of from about ¼ to ¹⁄₁₆ inch.

The resulting polyethylene/butene-1/diethyl maleate graft copolymer has a density of 0.950, a melting point of about 116–117° C., a melt index of 3.0 and copolymerizes to the extent that it contains 4.2% by weight of diethyl maleate.

Preparation of graft copolymer/titanium dioxide blends

Approximately 200 grams of the resulting pellets of the polyethylene/butene-1/diethyl maleate graft copolymer are mixed in a conventional laboratory mixer with 20 grams of commercial grade powdered titanium dioxide to form a homogeneous mixture. The mixture is then fed into a conventional 12″ x 6″ 2-roll mill heated to 310° F. The mill produces a homogeneous plastic sheet which is cut by hand into pieces having a size of from about ½ to about 2 inches.

About 24 grams of the resulting pieces are compression molded into 0.02″ x 8″ x 8″ plaques by pressing them in a mold (preheated to a temperature of about 300° F.) for 4 minutes at 1 ton pressure. The pressure is then increased to 15 tons. The mold is "bumped" by reducing the pressure to 5 tons and increasing it again to 15 tons. The "bumping" is done 3 times and then heated for 5 minutes at 15 tons pressure. The mold is cooled by trickling water through the press (Pasadena Hydraulic Co. press) until the mold is at room temperature.

The properties of the plaques from the blend are given in Table I.

Control

As a control to Example 1, a high density polyethylene copolymer containing the same amount of butene-1 is prepared so as to have the same density and approximately the same melt index as the graft copolymer of Example 1. The high density polyethylene copolymer containing about 1.59% of butene-1 is prepared in accordance with U.S. Patent 2,825,721, as previously described, at a temperature of about 280° F. so as to give a copolymer having a density of 0.950 and a melt index of 3.5.

A blend containing 10 parts of titanium dioxide per 100 parts of the above polymer is prepared, formed into pellets and then plaques according to the procedure of Example 1.

The properties of the plaques are given in Table I.

TABLE I

|  | Example 1 | Control |
|---|---|---|
| Density | 0.950 | 0.950 |
| Melt Index | 3.0 | 3.5 |
| Additive | $TiO_2$ | $TiO_2$ |
| Parts of Additive/100 parts polymer | 10 | 10 |
| Tensile Strength at Yield, p.s.i | 3,170 | 2,710 |
| Percent elongation | 90 | 20 |

As shown by the table, plaques prepared from the blends of the graft copolymer are stronger and may be stretched more than plaques from similar blends prepared from a polyethylene copolymer having the same density and approximately the same melt index.

EXAMPLE 2

Graft copolymer-titanium dioxide blends

The procedure of Example 1 is repeated employing 15 parts of $TiO_2$ per 100 parts of the polyethylene/butene-1/diethyl maleate graft copolymer.

The properties of the plaques are given in Table II.

Control

As a control to Example 2, a high density polyethylene copolymer containing the same amount of butene-1 is prepared so as to have the same density and approximately the same melt index as the graft copolymer of Example 2. The high density polyethylene copolymer containing about 1.59% of butene-1 is prepared in accordance with U.S. Patent 2,825,721, as previously described, at a temperature of about 280° F. so as to give a copolymer having a density of 0.950 and a melt index of 3.5.

A blend containing 15 parts of $TiO_2$ per 100 parts of the above polymer is prepared, formed into pellets and then plaques according to the procedure of Example 1.

The properties of the plaques are given in Table II.

TABLE II

|  | Example 2 | Control |
|---|---|---|
| Density | 0.950 | 0.950 |
| Melt Index | 3.0 | 3.5 |
| Additive | $TiO_2$ | $TiO_2$ |
| Parts of Additive/100 parts polymer | 15 | 15 |
| Tensile Strength at Yield, p.s.i | 3,070 | 2,750 |
| Percent Elongation | 400 | 20 |

As shown by the table, plaques prepared from the blends of the graft copolymer are stronger and may be stretched 20 times as much as plaques from a similar blend prepared from a polyethylene copolymer having the same density and approximately the same melt index.

EXAMPLE 3

Graft copolymer-titanium dioxide blends

The procedure of Example 1 is repeated employing 25 parts of $TiO_2$ per 100 parts of the polyethylene/butene-1/diethyl maleate graft copolymer.

The properties of the plaques are given in Table III.

Control

As a control to Example 3, a high density polyethylene copolymer containing the same amount of butene-1 is prepared so as to have the same density and approximately the same melt index as the graft copolymer of Example 3. The high density polyethylene copolymer containing about 1.59% of butene-1 is prepared in accordance with U.S. Patent 2,825,721, as previously described, at a temperature of about 280° F. so as to give a copolymer having a density of 0.950 and a melt index of 3.5.

A blend containing 25 parts of $TiO_2$ per 100 parts of the above polymer is prepared, formed into pellets and then plaques according to the procedure of Example 1.

The properties of the plaques are given in Table III.

TABLE III

|  | Example 3 | Control |
|---|---|---|
| Density | 0.950 | 0.950 |
| Melt Index | 3.0 | 3.5 |
| Additive | $TiO_2$ | $TiO_2$ |
| Parts of Additive/100 parts polymer | 25 | 25 |
| Tensile Strength at Yield, p.s.i | 3,220 | 1,650 |
| Percent Elongation | 120 | 15 |

As shown by the table, plaques prepared from the blends of the graft copolymer are approximately twice as strong as plaques of similar blends prepared from a polyethylene copolymer having the same density and approximately the same melt index. In addition, plaques from the graft copolymer blend will stretch approximately 8 times as much as plaques from a similar blend from the control copolymer.

EXAMPLE 4

Graft copolymer-titanium dioxide blends

The procedure of Example 1 is repeated employing 50 parts of $TiO_2$ per 100 parts of the polyethylene/butene-1/diethyl maleate graft copolymer.

The properties of the plaques are given in Table IV.

Control

As a control to Example 4, a high density polyethylene copolymer containing the same amount of butene-1 is prepared so as to have the same density and approximately the same melt index as the graft copolymer of Example 4. The high density polyethylene copolymer containing about 1.59% of butene-1 is prepared in accordance with U.S. Patent 2,825,721, as previously described, at a temperature of about 280° F. so as to give a copolymer having a density of 0.950 and a melt index of 3.5.

A blend containing 50 parts of $TiO_2$ per 100 parts of the above polymer is prepared, formed into pellets and then plaques according to the procedure of Example 1.

The properties of the plaques are given in Table IV.

TABLE IV

|  | Example 4 | Control |
|---|---|---|
| Density | 0.950 | 0.950 |
| Melt Index | 3.0 | 3.5 |
| Additive | $TiO_2$ | $TiO_2$ |
| Parts of Additive/100 parts polymer | 50 | 50 |
| Tensile Strength at Yield, p.s.i | 3,370 | 1,060 |
| Percent Elongation | 72 | 10 |

As shown by the table, plaques prepared from the blends of the graft copolymer are over 3 times as strong and may be stretched 7 times as much as plaques of similar blends prepared from a polyethylene copolymer having the same density and approximately the same melt index.

EXAMPLE 5

Graft copolymer-titanium dioxide blends

The procedure of Example 1 is repeated employing 75 parts of $TiO_2$ per 100 parts of the polyethylene/butene-1/diethyl maleate graft copolymer.

The properties of the plaques are given in Table V.

Control

As a control to Example 5, a high density polyethylene copolymer containing the same amount of butene-1 is prepared so as to have the same density and approximately the same melt index as the graft copolymer of Example 5. The high density polyethylene copolymer containing about 1.59% of butene-1 is prepared in accordance with U.S. Patent 2,825,721, as previously described, at a temperature of about 280° F. so as to give a copolymer having a density of 0.950 and a melt index of 3.5.

A blend containing 75 parts of $TiO_2$ per 100 parts of the above polymer is prepared, formed into pellets and then plaques according to the procedure of Example 1.

The properties of the plaques are given in Table V.

TABLE V

|  | Example 5 | Control |
|---|---|---|
| Density | 0.950 | 0.950 |
| Melt Index | 3.0 | 3.5 |
| Additive | $TiO_2$ | $TiO_2$ |
| Parts of Additive/100 parts polymer | 75 | 75 |
| Tensile Strength at Yield, p.s.i. | 3,520 | 730 |
| Percent Elongation | 42 | 5 |

As shown by the table, plaques from the blends of the graft copolymer are over 4 times as strong and may be stretched over 8 times as much as plaques of a similar blend prepared from a polyethylene copolymer having the same density and approximately the same melt index.

EXAMPLE 6

Graft copolymer-titanium dioxide blends

The procedure of Example 1 is repeated employing 100 parts of $TiO_2$ per 100 parts of the polyethylene/butene-1/diethyl maleate graft copolymer.

The properties of the plaques are given in Table VI.

Control

As a control to Example 6, a high density polyethylene copolymer containing the same amount of butene-1 is prepared so as to have the same density and approximately the same melt index as the graft copolymer of Example 6. The high density polyethylene copolymer containing about 1.59% of butene-1 is prepared in accordance with U.S. Patent 2,825,721, as previously described, at a temperature of about 280° F. so as to give a copolymer having a density of 0.950 and a melt index of 3.5.

A blend containing 100 parts of $TiO_2$ per 100 parts of the above polymer is prepared, formed into pellets and then plaques according to the procedure of Example 1.

The properties of the plaques are given in Table VI.

TABLE VI

|  | Example 6 | Control |
|---|---|---|
| Density | 0.950 | 0.950 |
| Melt Index | 3.0 | 3.5 |
| Additive | $TiO_2$ | $TiO_2$ |
| Parts of Additive/100 parts polymer | 100 | 100 |
| Tensile Strength at Yield, p.s.i. | 3,460 | 490 |
| Percent Elongation | 40 | 5 |

As shown by the table, the blends of the graft copolymer are approximately 7 times as strong and may be stretched about 8 times as much as plaques prepared from similar blends prepared from a polyethylene copolymer having the same density and approximately the same melt index.

EXAMPLE 7

Preparation of polyethylene/butene-1/dibutyl maleate graft copolymer

A high density polyethylene copolymer containing about 1.59% of butene-1 is prepared in accordance with U.S. Patent 2,949,447, as previously described, to give a copolymer having a density of 0.943, a melt index of 0.0 and an $MI_{21}$ of 1.6.

848 pounds of the polyethylene copolymer are mixed in a ribbon blender with a solution of 150 pounds of dibutyl maleate and 2 pounds of t-butyl hydroperoxide. The homogeneous mixture is fed into a "Hartig" 2½ inch extruder having a length to diameter ratio of 20 to 1 and equipped with electric temperature controls covering 3 heating zones. The feed end is cooled with tap water and the screw speed is 30 r.p.m. The temperature profile is Zone 1=345° F., Zone 2=670° F., Zone 3=395° F. and die temperature = 300° F. The die produces 3 strands at an extrusion rate of about 43 pounds per hour employing a pressure of 250 to 500 pounds per square inch. The strands are cut into pellets having a size of from about 1/10 to 1/4 inch.

The resulting polyethylene/butene-1/dibutyl maleate graft copolymer has a density of 0.948, a melting point of 116–117° C., a melt index of 1.0 and copolymerizes to the extent that it contains 5.0% by weight of dibutyl maleate. The solubility test in boiling xylene shows that no "gel" (i.e. crosslinked material) has formed in the product.

Preparation of graft copolymer-carbon black blends

Approximately 70.9 pounds of the resulting pellets of the polyethylene/butene-1/dibutyl maleate graft copolymer are mixed in a conventional laboratory mixer with 29.1 pounds of a commercial grade of powdered semi-conductive carbon black to form a homogeneous mixture. The mixture is then placed in a Banbury Mixer, heated to a temperature of about 400° F. and mixed for a period of about 5 minutes to give a homogeneous mass. The mix is pelletized to a size of about ⅛ to about ¼ inch.

About 24 grams of the resulting pellets are compression molded into 0.02″ x 8″ x 8″ plaques by pressing them in a mold (preheated to a temperature of about 300–310° F.) for 4 minutes at 1 ton pressure. The pressure is then increased to 15 tons. The mold is "bumped" by reducing the pressure to 5 tons and increasing it again to 15 tons. The "bumping" is done 3 times and then heated for 5 minutes at 15 tons pressure. The mold is cooled by trickling water through the press (Pasadena Hydraulic Co. press) until the mold is at room temperature.

The properties of the plaques from the blend are given in Table VII.

TABLE VII

| | |
|---|---|
| Density | 1.08 |
| Melt index | 0.0 |
| $MI_{21}$ | 17.5 |
| Additive | Carbon black |
| Parts of additive/100 parts polymer | 41 |
| Tensile strength at yield, p.s.i. | 3,400 |
| Percent elongation | 560 |
| Gurley stiffness (mg./20 mils) | 6,050 |
| Volume resistivity ($\times 10^4$ ohm-cm.) | 4.4 |

EXAMPLE 8

Preparation of polyethylene/butene-1/dibutyl maleate graft copolymer

A polyethylene/butene-1/dibutyl maleate graft copolymer having a density of 0.948, a melting point of 116–117° C., a melt index of 1.0 and containing 5.0% by weight of dibutyl maleate is prepared and formed into pellets in accordance with the procedure of Example 7.

Preparation of blends of graft copolymer/antimony oxide and chlorinated paraffin wax Approximately 900 grams of the pellets of the polyethylene/butene-1/dibutyl maleate graft copolymer are mixed in a conventional laboratory mixer with 441 grams of powdered antimony oxide and 237 grams of the chlorinated paraffin wax previously described. The mixture is then put into a Banbury mixer and mixed for 5 minutes at a temperature of 420° F. The Banbury produces a homogeneous mass which is then fed into a conventional 12″ x 6″ 2-roll mill heated to a temperature of about 300° F. The mill produces a homogeneous plastic sheet which is cut by hand into pieces having a size of from about ½". The resulting blend has a melt index of 1.3, a density of 1.34 and contains approximately 49 parts of antimony oxide and 26 parts of the chlorinated paraffin wax per 100 parts of the graft copolymer.

About 24 grams of the resulting pieces are compression molded into plaques according to the procedure of Example 7. The plaques are nearly mold size showing very little shrinkage and when tested according to ASTM-D-635-56T prove to be both non-drip and flame retardant in accordance with the test. The tensile strength of the plaques at yield is 2,910 p.s.i., ultimate tensile strength is 1,810 p.s.i. and the percent elongation is 130.

Procedure A control

As a control to Example 8, the beginning high density polyethylene copolymer of Example 7 containing about 1.59% of butene-1 and having a density of 0.943, a melt index of 0.0 and an $MI_{21}$ of 1.6, is blended with powdered antimony oxide and the chlorinated paraffin wax according to the procedure of Example 8. Using 40 parts of antimony oxide and chlorinated paraffin wax, it is found that the materials in the proportions set forth in Example 8 are incompatible, resulting in extreme brittleness in the plaques. By utilizing lower percentages of the antimony oxide and chlorinated praffin wax, it is found that the high density polyethylene copolymer will only hold about 8 parts of antimony oxide and 8 parts of chlorinated paraffin wax per 100 parts of the polyethylene polymer if a fully compatible product is to be obtained.

EXAMPLES 9–12

The procedure of Example 8 is repeated employing the following parts of additives per 100 parts of polyethylene/butene-1/dibutyl maleate graft copolymer: Ex. 9, 40 parts antimony oxide and 60 parts chlorinated paraffin wax; Ex. 10, 70 parts antimony oxide and 30 parts chlorinated paraffin wax; Ex. 11, 50 parts antimony oxide and 50 parts chlorinated paraffin wax; Ex. 12, 50 parts antimony oxide and 42.7 parts chlorinated paraffin wax.

The compositions are fully compatible with the additives and all prove to be non-drip, flame retardant compositions when tested in accordance with ASTM-D-635-56T.

EXAMPLE 13

Preparation of graft copolymer/antimony oxide-ammonium fluoborate blends

The procedure of Example 7 is repeated to prepare the polyethylene/butene-1/dibutyl maleate copolymer. The properties are the same as in Example 7.

Approximately 100 pounds of the resulting pellets of the polyethylene/butene-1/dibutyl maleate graft copolymer are mixed in a conventional laboratory mixer with 18 pounds of ammonium fluoborate, 9 pounds antimony oxide, and 0.1 pound distearyl thiodipropionate. The mixture is then placed in a Banbury mixer, heated to a temperature of about 325° F. and mixed for a period of about 5 minutes to give a homogeneous mass. The mix is pelletized to a size of about ⅛ to about ¼ inch.

About 24 grams of the resulting pellets are compression molded into 0.02" x 8" x 8" plaques by pressing them in a mold (preheated to a temperature of about 300–310° F.) for 4 minutes at 1 ton pressure. The pressure is then increased to 15 tons. The mold is "bumped" by reducing the pressure to 5 tons and increasing it again to 15 tons. The "bumping" is done 3 times and then heated for 5 minutes at 15 tons pressure. The mold is cooled by removing the plaque and immediately quenching with tap water.

The properties of the plaques from the blend are given in Table VIII.

TABLE VIII

| | |
|---|---|
| Density | 1.06 |
| Melt index | 0.6±0.2 |
| Tensile strength at yield, p.s.i. (min.) | 2000 |
| Percent elongation | 100 |

The composition meets the requirements for flame resistance according to ASTM-D635-63.

EXAMPLE 14

Preparation of polyethylene/butene-1/dibutyl maleate graft copolymer

The procedure of Example 13 is repeated with the exception that 12 pounds of antimony oxide and 24 pounds of ammonium fluoborate are mixed in the graft copolymer instead of the amounts given in Example 13.

The properties of the plaques from the blends are given in Table IX.

TABLE IX

| | |
|---|---|
| Density | 1.08 |
| Melt index | 0.9 |
| Tensile strength at yield, p.s.i. | 2200 |
| Percent elongation | 290 |

EXAMPLES 15 AND 16

The procedure of Example 14 is repeated employing zinc tetramine fluoborate and nickel hexamine fluoborate rather than the ammonium fluoborate of Example 14. Substantially the same results are obtained.

EXAMPLE 17

The procedure of Example 7 is repeated to prepare a polyethylene/butene-1/dibutyl maleate graft copolymer having a density of 0.949, melting point of 121° C., melt index of 0.6, and containing about 5% by weight dibutyl maleate. The solubility test in boiling xylene shows that no gel has formed in the product. The graft polymer in an amount of 64 parts is combined on a Banbury mixer with 24 parts of cycloocta (a,e) bis-dicyclo (2:2:1) hexachlorohept-5-ene having chlorine content of 65.1% and melting point in excess of 350° C., and finely divided such that at least 90% passes a 325 U.S. Standard mesh screen, 12 parts of powdered antimony trioxide (also minus 325 mesh), and 1 part of heat stabilizers. The ingredients are worked on the Banbury mixer for a total of 14–20 minutes in 2 cycles to form a thoroughly mixed composition which was then pelletized upon extrusion from a 7:1 $L/D$ ratio 2½ inch extruder operated at 325° C. The pellets were then fed to a 24:1 $L/D$ ratio 2½ inch extruder and formed into a 12 mil thick sheet at an extrusion temperature of 325° C. Evaluation of the extruded sheet material showed a tensile strength of about 1800 p.s.i., an elongation at yield of 8%, an elongation at break of 450%, Dielectric Constant of 2.6, Dissipation Factor (at one megacycle) of .005, a substantial absence of cracking after more than 600 hours in accordance with Environmental Stress Cracking Test ASTM 1693 on a sample annealed 20 minutes at 85° C., flame retardance in accordance with the Vertical Burning Test of Chicago Underwriters Laboratories (Research Bulletin No. 55), and excellent heat aging properties after 240 hours at 85° C. such that at least substantially the original Dielectric Constant and Dissipation Factor values are retained along with 80% of the original tensile strength, more than 60% of the original elongation at break, and at least 90% of the original elongation at yield. Copper wires laminated between two sheets formed by this example gave an excellent multi-wire conductor suitable for use in electronic computer applications.

It is obvious that mixtures of particulate materials may be used and that the size of the particulate material employed may vary depending upon the surface effect desired, the appearance, the amount of conductivity and the like. Also, as demonstrated by the examples, other materials such as chlorinated paraffin wax and fluoborates may be added to the compositions of the present invention to obtain a specific effect such as flame resistance. Additional materials such as pentaerythritol thiobis (phenols) and the like may be added to the blends to act as stabilizers for the chlorine-containing material when producing flame resistance compositions.

The composition formed in accordance with the present invention can be fabricated into a variety of other useful articles such as bottles, toys, sheets and films in the same manner as the original high density polyethylene homopolymer or copolymer. For example, the compositions of the present invention can be blow-molded, injection molded, compression molded, or extruded into films, bottles, tubing, filaments, sheets, wrapping materials and the like.

Many equivalent modifications will become apparent to those skilled in the art from a reading of the foregoing without a departure from the inventive concept.

I claim:

1. A polymer composition comprising a blend of (1) a graft copolymer of (A) a polyethylene hydrocarbon polymer having a density of at least about 0.940 and containing at least about 90% by weight of ethylene in the polymer chain and (B) a maleic acid diester, the maleic acid diester being present in the graft copolymer in amounts of from about 0.5 to about 12% by weight and (2) a solid inert particulate material selected from the group consisting of titanium dioxide, carbon black, antimony trioxide and mixtures thereof, being present in amounts of from about 5 to about 125 parts per 100 parts of the graft copolymer on a weight basis.

2. The polymer composition of claim 1 wherein the maleic acid diester is diethyl maleate.

3. The polymer composition of claim 1 wherein the maleic acid diester is dibutyl maleate.

4. A polymer composition comprising a blend of (1) a graft copolymer of (A) a polyethylene hydrocarbon polymer having a density of at least about 0.940 and containing at least about 90% by weight of ethylene in the polymer chain and (B) a maleic acid diester, the maleic acid diester being present in the graft copolymer in amounts of from about 0.5 to about 12% by weight and (2) titanium dioxide in an amount from about 5 to about 125 parts per 100 parts of the graft copolymer on a weight basis.

5. A polymer composition comprising a blend of (1) a graft copolymer of (A) a polyethylene hydrocarbon polymer having a density of at least about 0.940 and containing at least about 90% by weight of ethylene in the polymer chain and (B) a maleic acid diester, the maleic acid diester being present in the graft copolymer in amounts of from about 0.5 to about 12% by weight and (2) carbon black in an amount from about 5 to about 125 parts per 100 parts of the graft copolymer on a weight basis.

6. A composition in accordance with claim 5 in which the graft copolymer has a melt index not exceeding about 1 and the amount of carbon black is between 8 to 60 parts.

7. A polymer composition comprising a blend of (1) a graft copolymer of (A) a polyethylene hydrocarbon polymer having a density of at least about 0.940 and containing at least about 90% by weight of ethylene in the polymer chain and (B) a maleic acid diester, the maleic acid diester being present in the graft copolymer in amounts of from about 0.5 to about 12% by weight and (2) antimony trioxide in an amount from about 5 to about 125 parts per 100 parts of the graft copolymer on a weight basis.

8. The composition of claim 7 in which there is also incorporated ammonium fluoborate in an amount between about 15 to 60 parts per 100 parts by weight of the graft copolymer, in which the amount of antimony trioxide is between 8 to 40 parts; and which the ratio of ammonium fluoborate to antimony trioxide is between 1:1 to 3:1.

9. A polymer composition comprising a blend of (1) a graft copolymer of (A) a polyethylene hydrocarbon polymer having a density of at least about 0.940 and containing at least about 90% by weight of ethylene in the polymer chain and (B) a maleic acid diester, the maleic acid diester being present in the graft copolymer in amounts of from about 0.5 to about 12% by weight; (2) a chlorinated hydrocarbon; and (3) antimony trioxide in an amount from about 5 to about 125 parts per 100 parts of the graft copolymer on a weight basis, said composition having non-drip flame-retardance in accordance with ASTM-D-635-56T.

10. The composition of claim 9 in which the graft copolymer has a melt index not exceeding about 1.

11. A non-drip flame-retardant wire coating polymer composition comprising an intimate blend of: (1) 100 parts by weight of a graft copolymer of (A) a polyethylene hydrocarbon polymer having a density of at least 0.94 and containing at least 90% by weight of ethylene in the polymer chain, and (B) a maleic acid diester, the maleic acid diester being present in the graft copolymer in amounts of from about 0.5 to about 12% by weight; (2) 15 to 60 parts by weight of a halogen-containing hydrocarbon having a halogen content between 35–80% by weight; and (3) 8 to 40 parts by weight of antimony trioxide.

12. The composition of claim 11 in which the halogen-containing hydrocarbon is a normally solid chlorine-containing hydrocarbon having chlorine content between 50–70% by weight present in amount between 20 to 50 parts; in which said antimony trioxide is present in an amount between 12 to 25 parts; in which the ratio by weight of the chlorine-containing hydrocarbon to antimony trioxide is between 1.5:1 to 2.5:1; and in which both said chlorine-containing hydrocarbon and antimony trioxide have a particle size such that at least 90% is minus 325 mesh.

13. The composition of claim 12 in which the chlorine-containing hydrocarbon is selected from the group of chlorendic anhydride, esters, amides, imides thereof, and mixtures thereof.

14. The composition of claim 12 in which the chlorine-containing hydrocarbon is cycloocta (a,e) bis-dicyclo (2:2:1) hexachlorohept-5-ene.

15. The composition of claim 14 in which the polyethylene hydrocarbon polymer portion of said graft copolymer contains between 0.5 to 5% by weight of butene-1, and in which said graft copolymer has a melt index not exceeding 1.

References Cited

UNITED STATES PATENTS

| | | | |
|---|---|---|---|
| 3,256,362 | 6/1966 | Craubner et al. | 260—878 |
| 3,267,173 | 8/1966 | Zeitlin | 260—878 |

FOREIGN PATENTS

| | | |
|---|---|---|
| 853,640 | 11/1960 | Great Britain. |
| 868,001 | 5/1961 | Great Britain. |
| 885,969 | 1/1962 | Great Britain. |

OTHER REFERENCES

Miles, D. C., et al.: Polymer Technology, Temple Press Books, London 1965, p. 342.

CMC, Reinhold Publishing Corporation, 17th Edition 1966, H–3.

MORRIS LIEBMAN, Primary Examiner

J. H. DERRINGTON, Assistant Examiner

U.S. Cl. X.R.

260—28.5, 45.75